United States Patent
Chen et al.

(10) Patent No.: US 10,338,976 B2
(45) Date of Patent: Jul. 2, 2019

(54) METHOD AND APPARATUS FOR PROVIDING SCREENSHOT SERVICE ON TERMINAL DEVICE AND STORAGE MEDIUM AND DEVICE

(71) Applicant: Baidu Online Network Technology (Beijing) Co., Ltd., Beijing (CN)

(72) Inventors: Cong Chen, Beijing (CN); Ye Song, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/512,397

(22) PCT Filed: Dec. 31, 2015

(86) PCT No.: PCT/CN2015/100174
§ 371 (c)(1),
(2) Date: Mar. 17, 2017

(87) PCT Pub. No.: WO2016/197590
PCT Pub. Date: Dec. 15, 2016

(65) Prior Publication Data
US 2018/0081744 A1    Mar. 22, 2018

(30) Foreign Application Priority Data
Jun. 12, 2015   (CN) .......................... 2015 1 0325704

(51) Int. Cl.
*G06F 9/54*       (2006.01)
*G06F 9/44*       (2018.01)
*G06F 9/451*      (2018.01)

(52) U.S. Cl.
CPC ............... *G06F 9/543* (2013.01); *G06F 9/44* (2013.01); *G06F 9/451* (2018.02); *G06F 9/452* (2018.02); *G06F 9/544* (2013.01)

(58) Field of Classification Search
None
See application file for complete search history.

(56) References Cited

U.S. PATENT DOCUMENTS

| 7,343,037 B1 * | 3/2008 | Kadatch | ............... H04N 1/644 |
| | | | 382/166 |
| 2002/0004811 A1 * | 1/2002 | Bauhofer | ................ G06F 9/52 |
| | | | 718/107 |

(Continued)

FOREIGN PATENT DOCUMENTS

| CN | 102253843 A | 11/2011 |
| CN | 103414751 A | 11/2013 |

(Continued)

OTHER PUBLICATIONS

International Search Report corresponding to International Patent Application No. PCT/CN2015/100174, State Intellectual Property Office of the P.R. China, dated Mar. 24, 2016; (2 pages).

*Primary Examiner* — Tuan C Dao
(74) *Attorney, Agent, or Firm* — Nixon Peabody LLP

(57) ABSTRACT

A method and apparatus for providing a screenshot service on a terminal device and a storage medium and device. The method includes: a producer thread responds to a received screenshot command instruction, executes a screenshot operation, and writes shot screen data into a buffer region; and a consumer thread reads the screen data stored by the producer thread from the buffer region, executes image processing on the screen data to generate a screenshot image, and returns the screenshot image to an application which invokes a screenshot service. Adopting a multi-thread mode of a producer/consumer to complete a screenshot service respectively through a producer thread used for executing screen shooting and a consumer thread used for executing image processing on shot screen data can especially reduce screenshot time on a portable terminal device (Continued)

with limited processing capability, and can complete the screenshot service within tens of milliseconds.

19 Claims, 3 Drawing Sheets

(56) References Cited

U.S. PATENT DOCUMENTS

| | | | |
|---|---|---|---|
| 2003/0225816 A1* | 12/2003 | Morrow | G06F 9/3851 718/107 |
| 2012/0221946 A1 | 8/2012 | Dovey et al. | |
| 2012/0266068 A1* | 10/2012 | Ryman | G06F 3/0485 715/719 |
| 2013/0155086 A1 | 6/2013 | Sartain et al. | |
| 2013/0194286 A1 | 8/2013 | Bourd | |
| 2014/0022269 A1* | 1/2014 | Zheng | G09G 5/001 345/545 |
| 2014/0237405 A1* | 8/2014 | Wu | G06F 9/451 715/765 |

FOREIGN PATENT DOCUMENTS

| | | |
|---|---|---|
| CN | 103442071 A | 12/2013 |
| CN | 104899039 A | 9/2015 |

\* cited by examiner

METHOD AND APPARATUS FOR PROVIDING SCREENSHOT SERVICE ON TERMINAL DEVICE AND STORAGE MEDIUM AND DEVICE

CROSS-REFERENCE TO RELATED APPLICATION

This application is a U.S. National Stage of International Application No. PCT/CN2015/100174, filed Dec. 31, 2015, which is related to and claims priority from Chinese Application No. 201510325704.0, filed on Jun. 12, 2015, entitled "Method and Apparatus for Providing Screenshot Service on Terminal Device," the entire disclosures of which are hereby incorporated by reference in their entireties.

TECHNICAL FIELD

The present disclosure relates to the field of computer application, and specifically to a method, an apparatus, a storage medium and a device for providing a screenshot service on a terminal device.

BACKGROUND

Terminal devices such as personal computers, notebook computers, smart phones, tablet computers, and personal digital assistants are generally provided with a screenshot function. A user can capture an image of the entire screen or part of the screen (for example, a window or an area showing some text) by using a shortcut key, a menu item or a functional button.

During the screenshot process, screen data of a target area needs to be captured first. Next, image processing is performed on the captured screen data to convert (for example, by scaling, reversion, matrix transformation, etc.) the screen data into image data according to predetermined parameters. Then, the image data is stored or displayed.

Because portable terminals such as smart phones have limited computing and processing capability, screen shooting and image processing are separately performed in existing screenshot solutions for portable terminals. The two processing steps usually require a processing time of at least hundreds of milliseconds. Currently, there is no solution that can reduce the latency of screen capturing and processing to below 50 milliseconds on Android phones.

Due to this relatively long latency, screen recording cannot be performed on time and in real time. Therefore, the existing solutions are not suitable for products that require real-time multi-screen interaction. In addition, because screen shooting and image processing are separately performed, the cumbersome steps lead to system resource cost and chaos in data management.

In addition, when integrated into a third-party system, existing screenshot solutions need to be integrated into the product architecture of the third-party system, resulting in high integration costs and maintenance difficulty of host products.

SUMMARY

An objective of embodiments of the present disclosure is to provide a method and apparatus for providing a screenshot service on a terminal device and a storage medium and device, so as to reduce the processing time for screen shooting and improve user experience.

A first aspect of the present disclosure provides a method for providing a screenshot service on a terminal device. The method comprises: executing, by a producer thread, a screenshot operation in response to a received screenshot command instruction, and writing screen data captured into a buffer; and reading, by a consumer thread, the screen data stored by the producer thread from the buffer, executing image processing on the screen data to generate a screenshot image, and returning the screenshot image to an application invoking the screenshot service.

Preferably, the method further comprises: controlling following processes by a thread synchronization mechanism to prevent the producer thread and the consumer thread from simultaneously accessing the buffer: a process of executing the screenshot operation by the producer thread; a process of writing the screen data captured into the buffer by the producer thread; and a process of reading the screen data stored by the producer thread from the buffer by the consumer thread.

Preferably, the method comprises: obtaining, by the consumer thread, a process parameter of the screenshot command. The executing, by the consumer thread, the image processing on the screen data to generate the screenshot image comprises: executing, by the consumer thread, the image processing on the screen data according to the obtained processing parameter of the screenshot command, to generate the screenshot image.

Preferably, the method comprises: starting, by a main thread of the screenshot service, the producer thread and the consumer thread, and establishing, at a specified port, a session connection to the application invoking the screenshot service; and determining, by the producer thread, a screenshot command instruction being received, by listening to a data reading instruction on a session connection.

Preferably, the returning the screenshot image, by the consumer thread, to the application invoking the screenshot service comprises: sending, by the consumer thread, the screenshot image to the application invoking the screenshot service via the session connection.

Preferably, the main thread of the screenshot service sets at least one buffer.

Preferably, the process of writing the shot screen data into the buffer by the producer thread comprises: writing, by the producer thread, the shot screen data into the buffer according to a writing location, and updating the data length of the buffer and the writing location.

Preferably, the reading, by a consumer thread, the screen data stored by the producer thread from the buffer comprises: reading, by the consumer thread, the screen data stored by the producer thread from the buffer according to a reading location, and updating the data length of the buffer and the reading location.

Preferably, the buffer is a circular buffer.

Optionally, the thread synchronization mechanism is one of a mutex lock, a critical section, an event, and a semaphore.

A second aspect of the present disclosure also provides an apparatus for providing a screenshot service on a terminal device. The apparatus comprises: a screenshot operation module, for executing, by a producer thread, a screenshot operation in response to a received screenshot command instruction, and writing screen data captured into a buffer; and a data processing module, for reading, by a consumer thread, the screen data stored by the producer thread from the buffer, executing image processing on the screen data to generate a screenshot image, and returning the screenshot image to an application invoking the screenshot service.

Preferably, the apparatus further comprises: a thread synchronization module, for controlling following processes by a thread synchronization mechanism to prevent the producer thread and the consumer thread from simultaneously accessing the buffer: a process of executing the screenshot operation by the producer thread; a process of writing the screen data captured into the buffer by the producer thread; and a process of reading the screen data stored by the producer thread from the buffer by the consumer thread.

Preferably, the data processing module is further used for obtaining, by the consumer thread, a process parameter of the screenshot command, and executing the image processing on the screen data according to the obtained processing parameter of the screenshot command, to generate the screenshot image.

Preferably, the apparatus further comprises: a main control module, for starting, by a main thread of the screenshot service, the producer thread and the consumer thread, and establishing, at a specified port, a session connection to the application invoking the screenshot service; and the screenshot operation module is used for determining, by the producer thread, a screenshot command instruction being received, by listening to a data reading instruction on a session connection.

Preferably, the data processing module is used for sending, by the consumer thread, the screenshot image to the application invoking the screenshot service via the session connection.

Preferably, the main thread of the screenshot service sets at least one buffer.

Preferably, the screenshot operation module is used for writing, by means of the producer thread, the shot screen data into the buffer according to a writing location, and updating the data length of the buffer and the writing location.

Preferably, the data processing module is used for reading, by means of the consumer thread, the screen data stored by the producer thread from the buffer according to a reading location, and updating the data length of the buffer and the reading location.

Preferably, the buffer is a circular buffer.

Optionally, the thread synchronization mechanism comprises one of a mutex lock, a critical section, an event, and a semaphore.

A third aspect of the present disclosure also provides a storage medium comprising computer-executable instructions, the computer-executable instructions being configured to, when executed by a computer processor, execute a method for providing a screenshot service on a terminal device, the method comprising:

executing, by a producer thread, a screenshot operation in response to a received screenshot command instruction, and writing screen data captured into a buffer; and reading, by a consumer thread, the screen data stored by the producer thread from the buffer, executing image processing on the screen data to generate a screenshot image, and returning the screenshot image to an application invoking the screenshot service.

A fourth aspect of the present disclosure also provides a device, comprising:

one or more processors;

a memory; and one or more programs, the one or more programs being stored in the memory and configured to, when executed by the one or more processors, to perform the following operations:

executing, by a producer thread, a screenshot operation in response to a received screenshot command instruction, and writing screen data captured into a buffer; and reading, by a consumer thread, the screen data stored by the producer thread from the buffer, executing image processing on the screen data to generate a screenshot image, and returning the screenshot image to an application invoking the screenshot service.

According to the method and apparatus for providing a screenshot service on a terminal device and the storage medium and device in the embodiments of the present disclosure, adopting a multi-thread mode of a producer/consumer to complete a screenshot service respectively through a producer thread used for executing screen shooting and a consumer thread used for executing image processing on shot screen data can especially reduce screenshot time on a portable terminal device with limited processing capability, and can complete the screenshot service within tens of milliseconds.

In addition, on a given device, a client-server (C/S) architecture in which an application using a screenshot service is used as the client side and entire processing of the screenshot service is used as the server side is adopted, so as to isolate the detailed screenshot processing operations from the application that uses the screenshot service, thereby facilitating the integration of the screenshot service into other product architectures.

BRIEF DESCRIPTION OF THE DRAWINGS

To describe the technical solutions in the embodiments of the present disclosure more clearly, the drawings that need to be used in the embodiments are briefly introduced. It would be obvious that the drawings in the following description are merely some embodiments of the present disclosure, and those of ordinary skill in the art may further make modifications and replacements to these drawings without creative efforts.

DETAILED DESCRIPTION OF EMBODIMENTS

The basic idea of the present disclosure is to provide a technical solution of providing a screenshot service on a terminal device, so as to adopt a multi-thread mode of a producer/consumer to complete a screenshot service respectively through a producer thread used for executing screen shooting and a consumer thread used for executing image processing on shot screen data.

In addition, on a given device, a client-server (C/S) architecture in which an application using a screenshot service is used as the client side and entire processing of the screenshot service is used as the server side is adopted, so as to isolate the detailed screenshot processing operations from the application that uses the screenshot service, thereby facilitating the integration of the screenshot service into other product architectures.

Exemplary embodiments of the present disclosure will be described in detail with reference to the accompanying drawings.

First Embodiment

Figure 1:
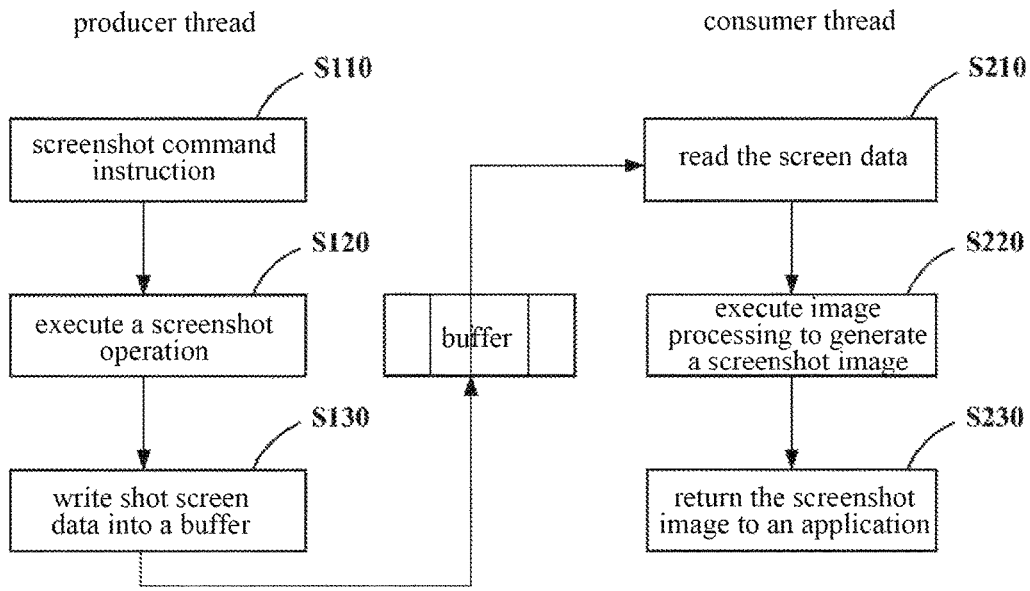
FIG. 1 is a flow chart of a method for providing a screenshot service on a terminal device according to a first embodiment of the present disclosure.

FIG. 1 is a flow chart of a method for providing a screenshot service on a terminal device according to a first embodiment of the present disclosure. For example, the method for providing a screenshot service according to the first embodiment of the present disclosure may be executed by an apparatus shown in FIG. 4.

Referring to FIG. 1, a screenshot service first starts a producer thread and a consumer thread.

After a user of a terminal device sends a screenshot command, in step S110, the producer thread receives or detects a screenshot command instruction of the user; in step S120, the producer thread executes a screenshot operation to obtain screen data; in step S130, the producer thread writes the shot screen data into a buffer. In step S120, the producer thread may execute high-speed screen shooting by invoking a native screenshot method of Android system.

Here, the buffer is a global buffer accessible by both the producer thread and the consumer thread.

Then, by using a thread synchronization mechanism that is set between the producer thread and the consumer thread, the consumer thread starts to execute steps S210 to S230.

Specifically, in step S210, the consumer thread reads the screen data stored by the producer thread from the buffer; in step S220, the consumer thread executes necessary image processing on the screen data to generate a screenshot image; in step S230, the consumer thread returns the screenshot image to an application which invokes the screenshot service.

Through the processing in the foregoing steps, according to the method for providing a screenshot service on a terminal device, screen shooting and image processing can be executed separately by using a producer thread and a consumer thread, and the shot screen data is transferred by using a shared data buffer, thereby reducing the processing time for screen shooting and improving user experience.

Second Embodiment

Figure 2:
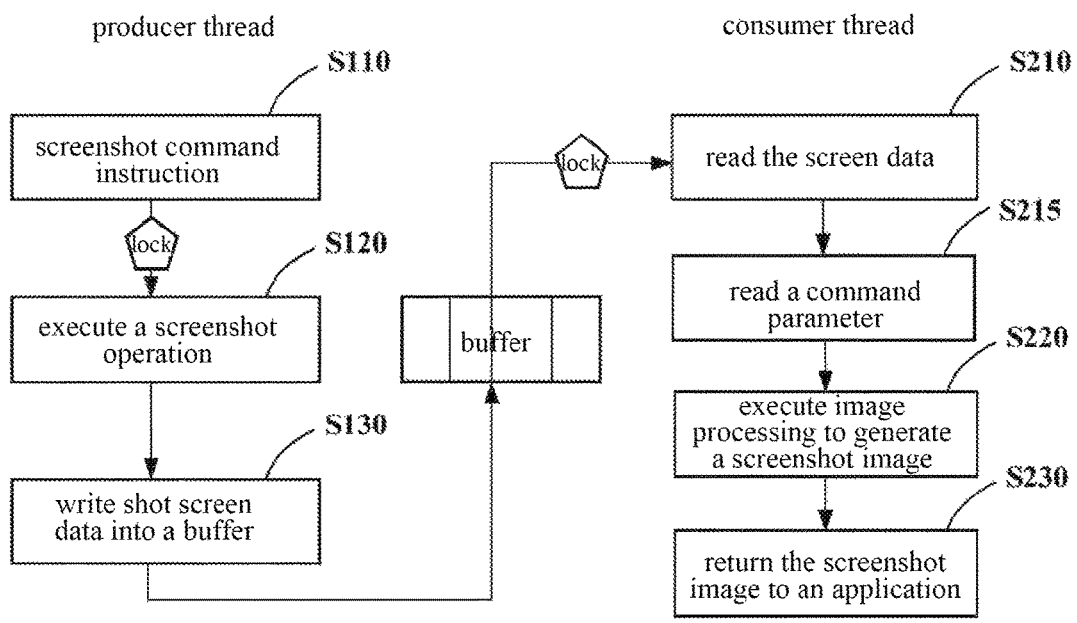
FIG. 2 is a flow chart of a method for providing a screenshot service on a terminal device according to a second embodiment of the present disclosure.

FIG. 2 is a flow chart of a method for providing a screenshot service on a terminal device according to a second embodiment of the present disclosure. Operations of steps in FIG. 2 that have like reference numerals as those in FIG. 1 are respectively similar to the operations of the corresponding steps in FIG. 1, and will not be repeatedly described here.

Because the screen shooting and the image processing of the screenshot service are executed separately by using the producer thread and the consumer thread, to synchronously control read and write operations on the buffer, according to an exemplary embodiment of the present disclosure, the method further includes: controlling the following processing by using a thread synchronization mechanism to prevent the producer thread and the consumer thread from simultaneously accessing the buffer: the processing of executing the screenshot operation by the producer thread; the processing of writing the shot screen data into the buffer by the producer thread; and the processing of reading the screen data stored by the producer thread from the buffer by the consumer thread.

The thread synchronization mechanism may be, but not limited to, a mutex lock, critical section, event, and semaphore. The second embodiment of the present disclosure is further described below through an example in which the producer thread and the consumer thread uses a mutex lock.

Referring to FIG. 2, specifically, before executing step S120, the producer thread first obtains the mutex lock; after completing the operation of step S130, the producer thread releases the mutex lock.

On the other hand, before executing step S210, the consumer thread also needs to obtain the mutex lock; after completing step S210, the consumer thread releases the mutex lock.

Further, the consumer thread obtains a processing parameter of the screenshot command, and the processing of executing image processing on the screen data by the consumer thread to generate a screenshot image may specifically include: executing, by the consumer thread, image processing on the screen data according to the obtained processing parameter of the screenshot command, to generate the screenshot image. The processing parameter may include at least one of resolution, size, rotation angle, and scaling multiple.

Further, as regards the read and write operations on the buffer, the producer thread and the consumer thread can maintain the data length of the buffer and respectively maintain the reading or writing location.

For example, step S130 may include: writing, by the producer thread, the shot screen data into the buffer according to a writing location, and updating the data length of the buffer and the writing location. step S210 may include: reading, by the consumer thread, the screen data stored by the producer thread from the buffer according to a reading location, and updating the data length of the buffer and the reading location.

Preferably, the main thread of the screenshot service sets at least one buffer. The buffer is a ring buffer, so that the producer thread and the consumer thread can circularly read and write the buffer.

As regards the overall framework of the screenshot service, a specific description will be given below with reference to the example shown in FIG. 3. It should be noted that the method for implementing the present disclosure is not limited to that shown in FIG. 3, and other suitable implementation methods may also be used.

Figure 3:
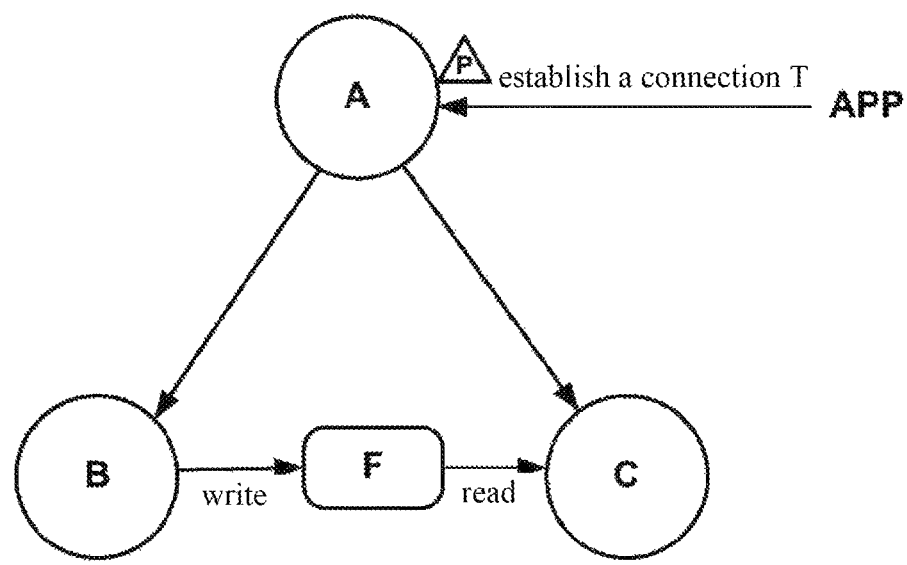
FIG. 3 is a schematic diagram of a screenshot service running framework according to the second embodiment of the present disclosure.

Referring to FIG. 3, an application (APP) using a screenshot service may start a screenshot service application or screenshot service main thread that provides a screenshot service to implement the present disclosure, or the APP may be a running screenshot service application or screenshot service main thread.

A main thread A of the screenshot service application or the screenshot service main thread A (hereinafter briefly referred to as main thread A) is responsible for starting the producer thread B and the consumer thread C, and establishing, at a specified port P, a session connection T to the application which invokes the screenshot service. The main thread A sets at least one buffer F.

The producer thread B determines that a screenshot command instruction is received, by listening to a data reading instruction on the session connection T. Then, as described above, the producer thread B obtains the mutex lock and then execute screen shooting of step S120 and the write operation of step S130. After completing step S130, the producer thread B releases the mutex lock.

The consumer thread C obtains the mutex lock before executing step S210. Then, if the buffer F is not empty, the consumer thread C executes steps S210, S215, S220, and S230. After completing step S210 or S215, the consumer thread C releases the mutex lock. In step S230, the consumer thread B sends, via the session connection T, the screenshot image to the application which invokes the screenshot service.

The foregoing C/S architecture in which the application using the screenshot service is used as the client side and the screenshot service is used as the server side not only can simplify the steps, implement high-speed screen shooting, and provide a screenshot image to the application, but also provides a simple service architecture, facilitating the integration into a third-party product.

Third Embodiment

Figure 4:
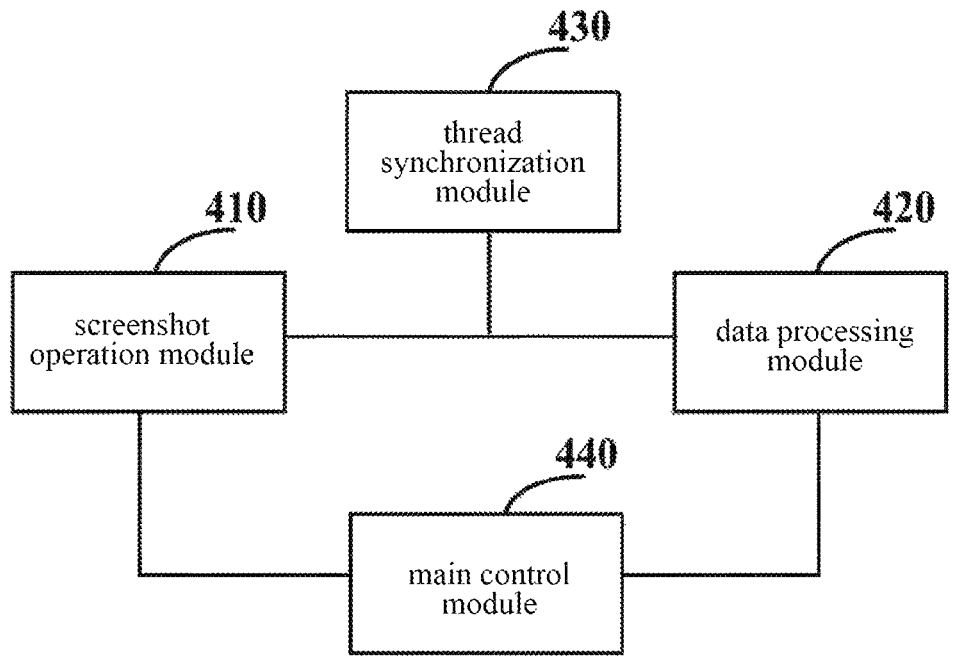
FIG. 4 is a logical block diagram of an apparatus for providing a screenshot service on a terminal device according to a third embodiment of the present disclosure.

FIG. 4 is a logical block diagram of an apparatus for providing a screenshot service on a terminal device according to a third embodiment of the present disclosure.

Referring to FIG. 4, the apparatus for providing a screenshot service on a terminal device includes a screenshot operation module 410 and a data processing module 420.

The screenshot operation module 410 is used for responding, by means of a producer thread, to a received screenshot command instruction, executing a screenshot operation, and writing shot screen data into a buffer.

The data processing module 420 is used for reading, by means of a consumer thread, the screen data stored by the producer thread from the buffer, executing image processing on the screen data to generate a screenshot image, and returning the screenshot image to an application which invokes a screenshot service.

According to a preferred embodiment of the present disclosure, the apparatus further includes: a thread synchronization module 430, for controlling the following processing by using a thread synchronization mechanism to prevent the producer thread and the consumer thread from simultaneously accessing the buffer:

the processing of executing the screenshot operation by the producer thread; the processing of writing the shot screen data into the buffer by the producer thread; and the processing of reading the screen data stored by the producer thread from the buffer by the consumer thread. The thread synchronization mechanism may be, but not limited to, a mutex lock, critical section, event, and semaphore.

According to a preferred embodiment of the present disclosure, the thread synchronization mechanism may include one of a mutex lock, critical section, event, and semaphore.

The data processing module 420 is further used for obtaining, by means of the consumer thread, a processing parameter of the screenshot command, and executing image processing on the screen data according to the obtained processing parameter of the screenshot command, to generate the screenshot image.

According to a preferred embodiment of the present disclosure, the apparatus further includes: a main control module 440, for starting, by means of a main thread of the screenshot service, the producer thread and the consumer thread, and establishing, at a specified port, a session connection to the application which invokes the screenshot service; and the screenshot operation module 410 is used for determining, by means of the producer thread, that a screenshot command instruction is received, by listening to a data reading instruction on the session connection.

Optionally, the data processing module 420 is used for sending, via the session connection, by means of the consumer thread, the screenshot image to the application which invokes the screenshot service.

Preferably, the main control module 440 is further used for setting, by means of the main thread of the screenshot service, at least one buffer.

Preferably, the screenshot operation module 410 is further used for writing, by means of the producer thread, the shot screen data into the buffer according to a writing location, and updating the data length of the buffer and the writing location.

Preferably, the data processing module 420 is used for reading, by means of the consumer thread, the screen data stored by the producer thread from the buffer according to a reading location, and updating the data length of the buffer and the reading location.

Preferably, the buffer is a ring buffer.

According to the technical solution provided in this embodiment of the present disclosure, adopting a multi-thread mode of a producer/consumer to complete a screenshot service respectively through a producer thread used for executing screen shooting and a consumer thread used for executing image processing on shot screen data can especially reduce screenshot time on a portable terminal device with limited processing capability, and can complete the screenshot service within tens of milliseconds.

In addition, on a given device, a client-server (C/S) architecture in which an application using a screenshot service is used as the client side and entire processing of the screenshot service is used as the server side is adopted, so as to isolate the detailed screenshot processing operations from the application that uses the screenshot service, thereby facilitating the integration of the screenshot service into other product architectures.

It should be noted that according to implementation requirements, various parts/steps described in the present application may be divided into more parts/steps, or two or more parts/steps or some operations of parts/steps may be combined to form a new part/step, so as to achieve the objectives of the present disclosure.

The above-mentioned method according to the present disclosure may be implemented in hardware or firmware, or may be implemented as software or computer code that can be stored in a recording medium (such as a CD ROM, a RAM, a floppy disk, a magnetic disk, or a magneto-optical disc) or implemented as computer code computer code downloaded over a network, which is originally stored in a remote recording medium or a non-transitory machine readable medium and to be stored on a local recording medium, so that the methods described herein can be rendered in such software that is stored on the recording medium using a general-purpose computer, a special-purpose processor or programmable or dedicated hardware (such as an ASIC or FPGA). It would be appreciated that the computer, processor, microprocessor controller or programmable hardware includes memory components (for example, a RAM, a ROM, a flash) that may store or receive software or computer code that when accessed and executed by the computer, processor or hardware, implements the processing methods described herein. In addition, when a general-purpose computer accesses code for implementing the processing shown herein, the execution of the code transforms the general-purpose computer into a special-purpose computer for executing the processing shown herein.

Fourth Embodiment

An embodiment of the present disclosure provides a storage medium including computer-executable instructions, the computer-executable instructions being configured to, when executed by a computer processor, execute a method for providing a screenshot service on a terminal device, the method including:

responding, by a producer thread, to a received screenshot command instruction, executing a screenshot operation, and writing shot screen data into a buffer; and reading, by a consumer thread, the screen data stored by the producer thread from the buffer, executing image processing on the screen data to generate a screenshot image, and returning the screenshot image to an application which invokes a screenshot service.

When the above-mentioned storage medium executes the method, the method may specifically further include:

controlling the following processing by using a thread synchronization mechanism to prevent the producer thread and the consumer thread from simultaneously accessing the buffer:

the processing of executing the screenshot operation by the producer thread;

the processing of writing the shot screen data into the buffer by the producer thread; and the processing of reading the screen data stored by the producer thread from the buffer by the consumer thread.

When the above-mentioned storage medium executes the method, the thread synchronization mechanism includes one of a mutex lock, critical section, event, and semaphore.

When the above-mentioned storage medium executes the method, the method may specifically further include:

obtaining, by the consumer thread, a processing parameter of the screenshot command, the processing of executing image processing on the screen data by the consumer thread to generate a screenshot image includes:

executing, by the consumer thread, image processing on the screen data according to the obtained processing parameter of the screenshot command, to generate the screenshot image.

When the above-mentioned storage medium executes the method, the method may specifically further include:

starting, by a main thread of the screenshot service, the producer thread and the consumer thread, and establishing, at a specified port, a session connection to the application which invokes the screenshot service; and determining, by the producer thread, that a screenshot command instruction is received, by listening to a data reading instruction on the session connection.

When the above-mentioned storage medium executes the method, the processing of returning the screenshot image by the consumer thread to the application which invokes the screenshot service includes:

sending, via the session connection, by the consumer thread, the screenshot image to the application which invokes the screenshot service.

When the above-mentioned storage medium executes the method, the main thread of the screenshot service sets at least one buffer.

When the above-mentioned storage medium executes the method, the processing of writing the shot screen data into the buffer by the producer thread may specifically further include:

writing, by the producer thread, the shot screen data into the buffer according to a writing location, and updating the data length of the buffer and the writing location.

When the above-mentioned storage medium executes the method, the processing of reading the screen data stored by the producer thread from the buffer by the consumer thread may specifically further include:

reading, by the consumer thread, the screen data stored by the producer thread from the buffer according to a reading location, and updating the data length of the buffer and the reading location.

When the above-mentioned storage medium executes the method, the buffer may specifically be a ring buffer.

Fifth Embodiment

Figure 5:
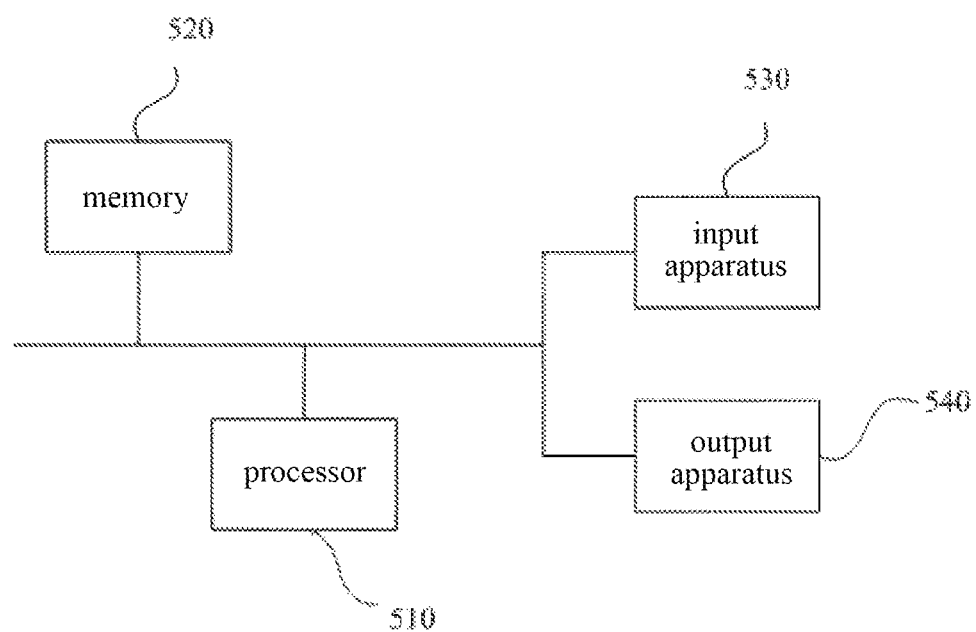
FIG. 5 is a schematic structural diagram of hardware of a device adapted to execute a method for providing a screenshot service on a terminal device according to a fifth embodiment of the present disclosure.

FIG. 5 is a schematic structural diagram of hardware of a device adapted to execute a method for providing a screenshot service on a terminal device according to a fifth embodiment of the present disclosure. Referring to FIG. 5, the device includes:

one or more processors 510, where one processor 510 is used as an example in FIG. 5;

a memory 520; and one or more modules.

The device may further include an input apparatus 530 and an output apparatus 540. The processor 510, the memory 520, the input apparatus 530, and the output apparatus 540 in the device may be connected by means such as a bus. In FIG. 5, the connection by a bus is used as an example.

As a computer-readable storage medium, the memory 520 can be used for storing software programs, computer-executable programs and modules, for example, program instructions/modules corresponding to the method for providing a screenshot service on a terminal device in the embodiments of the present disclosure (for example, the screenshot operation module 410, the data processing module 420, the thread synchronization module 430, and the main control module 440 in the apparatus for providing a screenshot service on a terminal device as shown in FIG. 4). The processor 510 runs the software programs, instructions and modules stored in the memory 520 to execute various functional applications and data processing of the device, that is, implement the method for providing a screenshot service on a terminal device in the above-mentioned method embodiments.

The memory 520 may include a program storage area and a data storage area. The program storage area can store an operating system and an application program required by at least one function. The data storage area can store data created according to the use of the terminal device. In addition, the memory 520 may include a high-speed random access memory, and may also include a non-volatile memory, for example, at least one magnetic disk storage, flash drive device, or other non-volatile solid-state storage device. In some examples, the memory 520 may further include remotely disposed memories relative to the processor 510. Such remote memories may be connected to a terminal device via a network. Examples of the above-mentioned network include, but are not limited to, the Internet, an enterprise intranet, a local area network, a mobile communications network, and a combination thereof.

The input apparatus 530 may be used for receiving digit or character information that is input, and generating key signal inputs related to user setting and functional control of the terminal. The output apparatus 540 may include a display device such as a display screen.

The one or more modules are stored in the memory 520, and when executed by the one or more processors 510, execute the following operations:

responding, by a producer thread, to a received screenshot command instruction, executing a screenshot operation, and writing shot screen data into a buffer; and reading, by a consumer thread, the screen data stored by the producer thread from the buffer, executing image processing on the screen data to generate a screenshot image, and returning the screenshot image to an application which invokes a screenshot service.

Further, the method may further include:

controlling the following processing by using a thread synchronization mechanism to prevent the producer thread and the consumer thread from simultaneously accessing the buffer:

the processing of executing the screenshot operation by the producer thread;

the processing of writing the shot screen data into the buffer by the producer thread; and the processing of reading the screen data stored by the producer thread from the buffer by the consumer thread.

Further, the thread synchronization mechanism may include one of a mutex lock, critical section, event, and semaphore.

Further, the method may further include:

obtaining, by the consumer thread, a processing parameter of the screenshot command, the processing of executing image processing on the screen data by the consumer thread to generate a screenshot image includes:

executing, by the consumer thread, image processing on the screen data according to the obtained processing parameter of the screenshot command, to generate the screenshot image.

Further, the method may further include:

starting, by a main thread of the screenshot service, the producer thread and the consumer thread, and establishing, at a specified port, a session connection to the application which invokes the screenshot service; and determining, by the producer thread, that a screenshot command instruction is received, by listening to a data reading instruction on the session connection.

Further, the processing of returning the screenshot image by the consumer thread to the application which invokes the screenshot service may include:

sending, via the session connection, by the consumer thread, the screenshot image to the application which invokes the screenshot service.

Further, the main thread of the screenshot service sets at least one buffer.

Further, the processing of writing the shot screen data into the buffer by the producer thread may include:

writing, by the producer thread, the shot screen data into the buffer according to a writing location, and updating the data length of the buffer and the writing location.

Further, the processing of reading the screen data stored by the producer thread from the buffer by the consumer thread may include:

reading, by the consumer thread, the screen data stored by the producer thread from the buffer according to a reading location, and updating the data length of the buffer and the reading location.

Further, the buffer may be a ring buffer.

Through the description of the foregoing implementations, those skilled in the art may clearly understand that the present disclosure may be implemented by software plus necessary general-purpose hardware, and definitely may also be implemented all by hardware, but in most cases, the former implementation is preferred. Based on such an understanding, the technical solutions in the present disclosure essentially, or the part contributing to the prior art may be embodied in the form of a software product. The computer software product may be stored in a computer-readable storage medium, such as a floppy disk of a computer, a read-only memory (ROM), a random access memory (RAM), a flash, a magnetic disk, or an optical disc, and includes several instructions for instructing a computer device (which may be a personal computer, a server, a network device, or the like) to perform the method described in the embodiments of the present disclosure.

It should be noted that in the above-mentioned embodiment of the apparatus for providing a screenshot service on a terminal device, the units and modules included are divided according to functional logic, but the present disclosure is not limited to the above-mentioned division manner as long as corresponding functions can be implemented. In addition, specific names of the functional modules are only for differentiating purposes and are not used to limit the protection scope of the present invention.

The above descriptions are merely specific implementations of the present disclosure, but the protection scope of the present disclosure is not limited thereto. Any variations or replacements that can be easily conceived of by those skilled in the art within the technical scope disclosed by the present disclosure shall be encompassed by the protection scope of the present disclosure. Therefore, the protection scope of the present disclosure shall be subject to the protection scope of the claims.

What is claimed is:

1. A method for providing a screenshot service on a terminal device, the method comprising:

executing, by a producer thread, a screenshot operation in response to a received screenshot command instruction, and writing screen data captured into a buffer; and reading, by a consumer thread, the screen data stored by the producer thread from the buffer, executing image processing on the screen data to generate a screenshot image, and returning the screenshot image to an application invoking the screenshot service;

the method further comprising:

starting, by a main thread of the screenshot service, the producer thread and the consumer thread, and establishing, at a specified port, a session connection to the application invoking the screenshot service; and determining, by the producer thread, a screenshot command instruction being received, by listening to a data reading instruction on a session connection.

2. The method according to claim 1, further comprising:

controlling following processes by a thread synchronization mechanism to prevent the producer thread and the consumer thread from simultaneously accessing the buffer:

a process of executing the screenshot operation by the producer thread;

a process of writing the screen data captured into the buffer by the producer thread; and a process of reading the screen data stored by the producer thread from the buffer by the consumer thread.

3. The method according to claim 2, wherein the thread synchronization mechanism comprises one of a mutex lock, a critical section, an event, and a semaphore.

4. The method according to claim 2, wherein the method further comprises:

obtaining, by the consumer thread, a process parameter of the screenshot command; and the executing, by the consumer thread, the image processing on the screen data to generate the screenshot image comprises:

executing, by the consumer thread, the image processing on the screen data according to the obtained processing parameter of the screenshot command, to generate the screenshot image.

5. The method according to claim 1, wherein the returning the screenshot image, by the consumer thread, to the application invoking the screenshot service comprises:
sending, by the consumer thread, the screenshot image to the application invoking the screenshot service via the session connection.

6. The method according to claim 1, wherein the main thread of the screenshot service sets at least one buffer.

7. The method according to claim 6, wherein the process of writing the screen data captured into the buffer by the producer thread comprises:
writing, by the producer thread, the screen data captured into the buffer according to a writing location, and updating a data length of the buffer and the writing location.

8. The method according to claim 6, wherein the reading, by a consumer thread, the screen data stored by the producer thread from the buffer comprises:
reading, by the consumer thread, the screen data stored by the producer thread from the buffer according to a reading location, and updating a data length of the buffer and the reading location.

9. The method according to claim 6, wherein the buffer is a circular buffer.

10. An apparatus for providing a screenshot service on a terminal device, comprising:
at least one processor; and
a memory storing instructions, the instructions when executed by the at least one processor, cause the at least one processor to perform operations, the operations comprising:
executing, by a producer thread, a screenshot operation in response to a received screenshot command instruction, and writing screen data captured into a buffer; and
reading, by a consumer thread, the screen data stored by the producer thread from the buffer, executing image processing on the screen data to generate a screenshot image, and returning the screenshot image to an application invoking the screenshot service;
the operations further comprising:
starting, by a main thread of the screenshot service, the producer thread and the consumer thread, and establishing, at a specified port, a session connection to the application invoking the screenshot service; and
determining, by the producer thread, a screenshot command instruction being received, by listening to a data reading instruction on a session connection.

11. The apparatus according to claim 10, the operations further comprising:
controlling following processes by a thread synchronization mechanism to prevent the producer thread and the consumer thread from simultaneously accessing the buffer:
a process of executing the screenshot operation by the producer thread;
a process of writing the screen data captured into the buffer by the producer thread; and
a process of reading the screen data stored by the producer thread from the buffer by the consumer thread.

12. The apparatus according to claim 11, wherein the thread synchronization mechanism comprises one of a mutex lock, a critical section, an event, and a semaphore.

13. The apparatus according to claim 11, wherein the operations further comprise:
obtaining, by the consumer thread, a process parameter of the screenshot command, and
the executing, by the consumer thread, the image processing on the screen data to generate the screenshot image comprises:
executing the image processing on the screen data according to the obtained processing parameter of the screenshot command, to generate the screenshot image.

14. The apparatus according to claim 10, wherein the returning the screenshot image, by the consumer thread, to the application invoking the screenshot service comprises:
sending, by the consumer thread, the screenshot image to the application invoking the screenshot service via the session connection.

15. The apparatus according to claim 10, wherein the main thread of the screenshot service sets at least one buffer.

16. The apparatus according to claim 15, wherein the process of writing the screen data captured into the buffer by the producer thread comprises:
writing, by the producer thread, the screen data captured into the buffer according to a writing location, and updating a data length of the buffer and the writing location.

17. The apparatus according to claim 15, wherein the reading, by a consumer thread, the screen data stored by the producer thread from the buffer comprises:
reading, by the consumer thread, the screen data stored by the producer thread from the buffer according to a reading location, and updating a data length of the buffer and the reading location.

18. The apparatus according to claim 15, wherein the buffer is a circular buffer.

19. A non-transitory computer storage medium storing a computer program, which when executed by one or more processors, cause the one or more processors to perform operations, the operations comprising:
executing, by a producer thread, a screenshot operation in response to a received screenshot command instruction, and writing screen data captured into a buffer; and
reading, by a consumer thread, the screen data stored by the producer thread from the buffer, executing image processing on the screen data to generate a screenshot image, and returning the screenshot image to an application invoking the screenshot service;
the operations further comprising:
starting, by a main thread of the screenshot service, the producer thread and the consumer thread, and establishing, at a specified port, a session connection to the application invoking the screenshot service; and
determining, by the producer thread, a screenshot command instruction being received, by listening to a data reading instruction on a session connection.

* * * * *